(12) United States Patent
Lu

(10) Patent No.: US 6,629,658 B2
(45) Date of Patent: Oct. 7, 2003

(54) FISHING LINE WINDING DEVICE

(76) Inventor: Han-Chi Lu, No. 22, Jien Ren Street, Taichung City (TW)

( * ) Notice: Subject to any disclaimer, the term of this patent is extended or adjusted under 35 U.S.C. 154(b) by 61 days.

(21) Appl. No.: 09/962,679

(22) Filed: Sep. 26, 2001

(65) Prior Publication Data

US 2003/0057312 A1 Mar. 27, 2003

(51) Int. Cl.$^7$ ................................................ B65H 75/00
(52) U.S. Cl. ...................................... 242/370; 242/902
(58) Field of Search ................................ 242/370, 323, 242/902

(56) References Cited

U.S. PATENT DOCUMENTS

| | | | | |
|---|---|---|---|---|
| 2,903,196 A | * | 9/1959 | Fowler | 242/388.7 |
| 3,312,418 A | * | 4/1967 | Haddock | 242/592 |
| 4,360,172 A | * | 11/1982 | Cope | 242/592 |
| 4,776,527 A | * | 10/1988 | Prowant | 242/591 |
| 5,375,788 A | * | 12/1994 | English | 242/129.8 |
| 5,513,463 A | * | 5/1996 | Drinkwater | 43/25 |
| 5,870,795 A | * | 2/1999 | Sizemore | 15/230.11 |
| 5,987,692 A | * | 11/1999 | Sizemore | 15/230.11 |
| 6,109,809 A | * | 8/2000 | Pistis | 401/197 |

* cited by examiner

Primary Examiner—Emmanuel Marcelo
(74) Attorney, Agent, or Firm—Charles E. Baxley

(57) ABSTRACT

A fishing line re-winding device includes a handle and a crank is connected to an end of the handle. The crank has a section that is perpendicular to the handle so that a mandrel of fishing line can be mounted to the section. An end member is mounted to the section to urge the mandrel in position. The reel is engaged with the handle and the fishing line is connected to the reel so that the fishing line is wound to the reel by rotating the crank handle of the reel.

5 Claims, 4 Drawing Sheets

FISHING LINE WINDING DEVICE

FIELD OF THE INVENTION

The present invention relates to a fishing line winding device which assists the user to scroll fishing line to the fishing reel.

BACKGROUND OF THE INVENTION

A fishing rod includes a fishing reel which has fishing line scrolled to a mandrel of the reel and a handle is used to rotate the mandrel to release or retrieve the fishing line. It is so often that the fishing line is broken during the fishing action. The reasons that cause the fishing line to be broken could be different, such as using the wrong number of pound of the fishing line could be one of the reasons, or the fishing line is scraped by rocks. If the fishing line is broken after it is released to a long length, the reel has to be sent back to fishing store to re-wind new fishing line. Because the fishing line is so long that the user cannot re-wind the new fishing by himself or herself. Therefore, many fishing lovers carry at least two reels in case of loss of the fishing line. Even when the reels are sent to the fishing store, the reels are re-wound by electric winding machine so that there is no proper device for the user to re-wind the fishing line at the fishing sites.

SUMMARY OF THE INVENTION

In accordance with one aspect of the present invention, there is provided a fishing line re-winding device which comprises a handle for connecting to a reel and a crank is connected to an end of the handle. The crank has a first section connected to the handle and a second section connected to the first section at an angle. A third section is connected to the second section and a fourth section is connected to the third section at an angle. An axis of the fourth section is perpendicular to an axis of the handle. A sleeve is mounted to the fourth section and a first end of the sleeve is stopped by the third section. An end member is mounted to the fourth section and a mandrel of fishing line is located between the end member and the sleeve.

The primary object of the present invention is to provide a fishing line re-winding device that is convenient for the user to re-wind the new fishing line to the reel.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
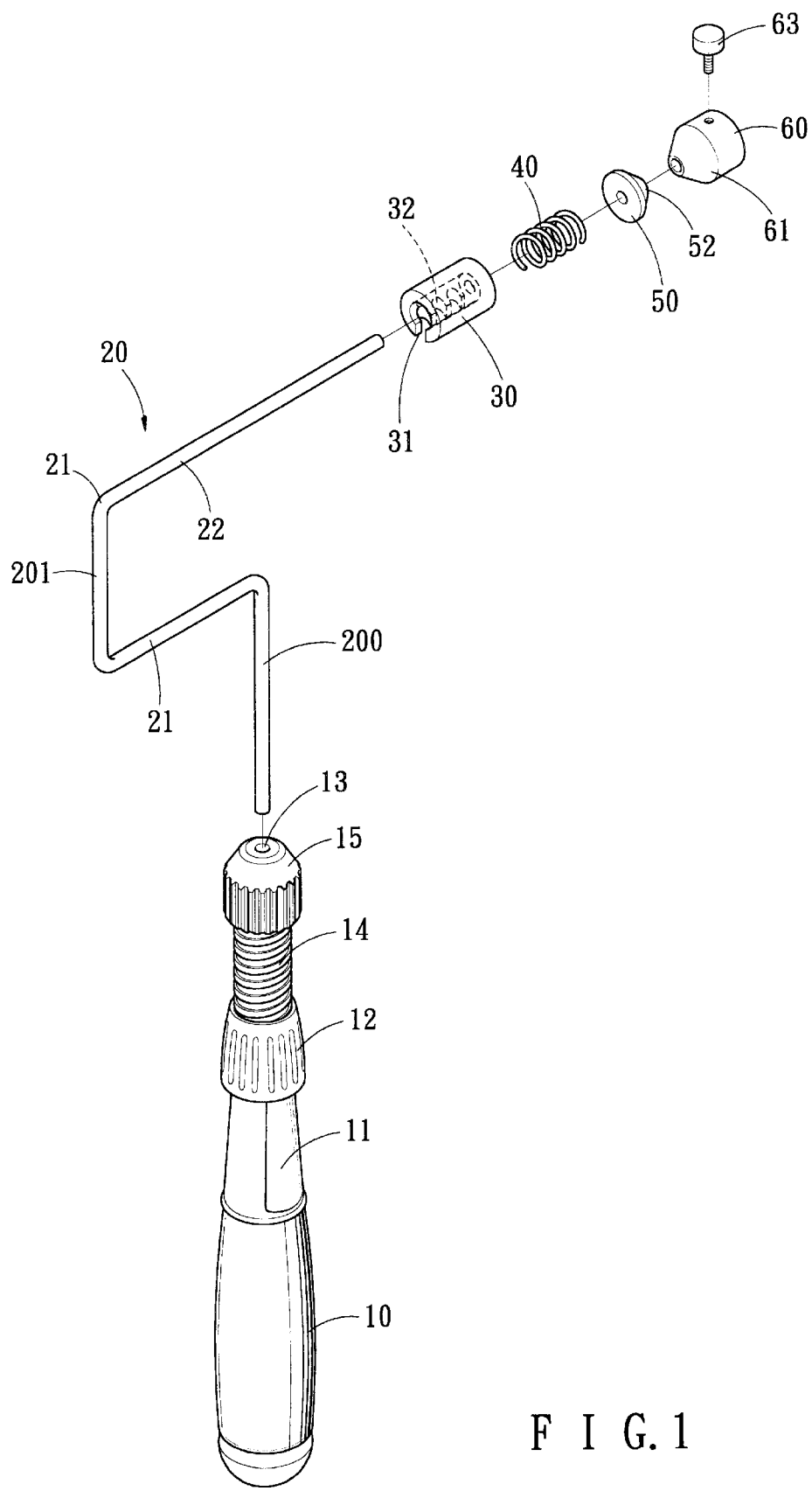
FIG. 1 is an exploded view to show a fishing line re-winding device of the present invention.
Figure 2:
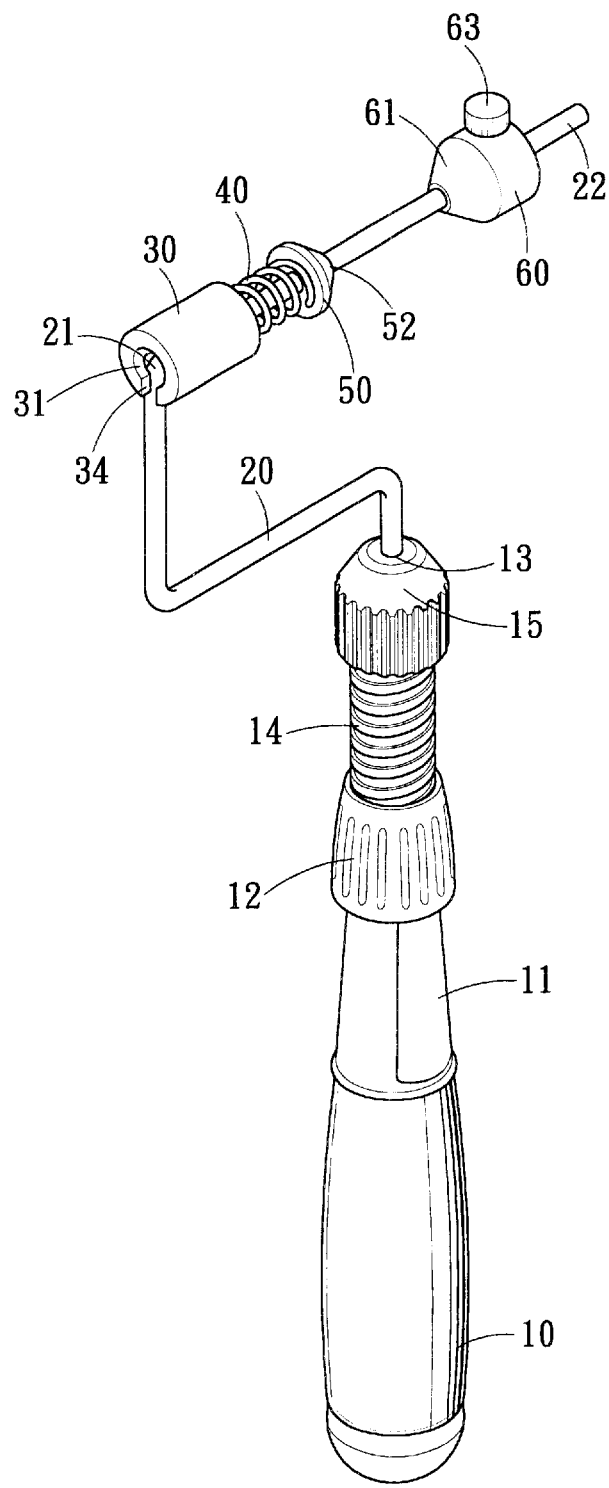
FIG. 2 is a perspective view to show the fishing line re-winding device of the present invention.
Figure 4:
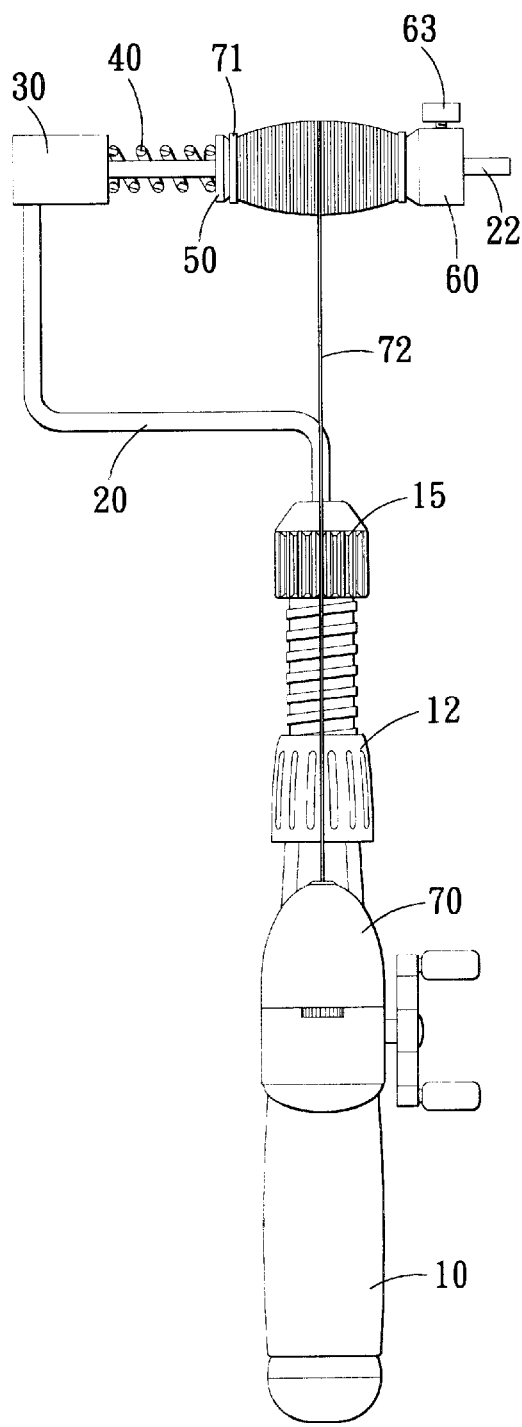
FIG. 4 is a side view to show a mandrel of fishing line is mounted to the crank and a reel is connected to the handle of the fishing line re-winding device of the present invention.

Referring to FIGS. 1 and 2, the fishing line re-winding device of the present invention comprises a handle 10 and a crank 20 is connected to an end of the handle 10. A flat surface 11 is defined in an outer periphery of the handle 10 and threaded section 14 is defined in the outer periphery of the handle 10. A positioning collar 12 is movably engaged with the threaded section 14 so that a fishing reel 70 as shown in FIG. 4 can be connected to the handle 10 by the clamping function of the positioning collar 12. An opening 13 is defined in the end of the handle 10 and a tightening collar 15 is engaged with the threaded section 14 so as to shrink the opening 13 to secure the crank 20.

The crank 20 has a first section 200 secured in the opening 13 of the handle 10 and a second section 21 is connected to the first section at a right angle. A third section 201 is connected to the second section 21 at a right angle and a fourth section 22 is connected to the third section 201 at a right angle. An axis of the fourth section 22 is perpendicular to an axis of the handle 10.

Figure 3:
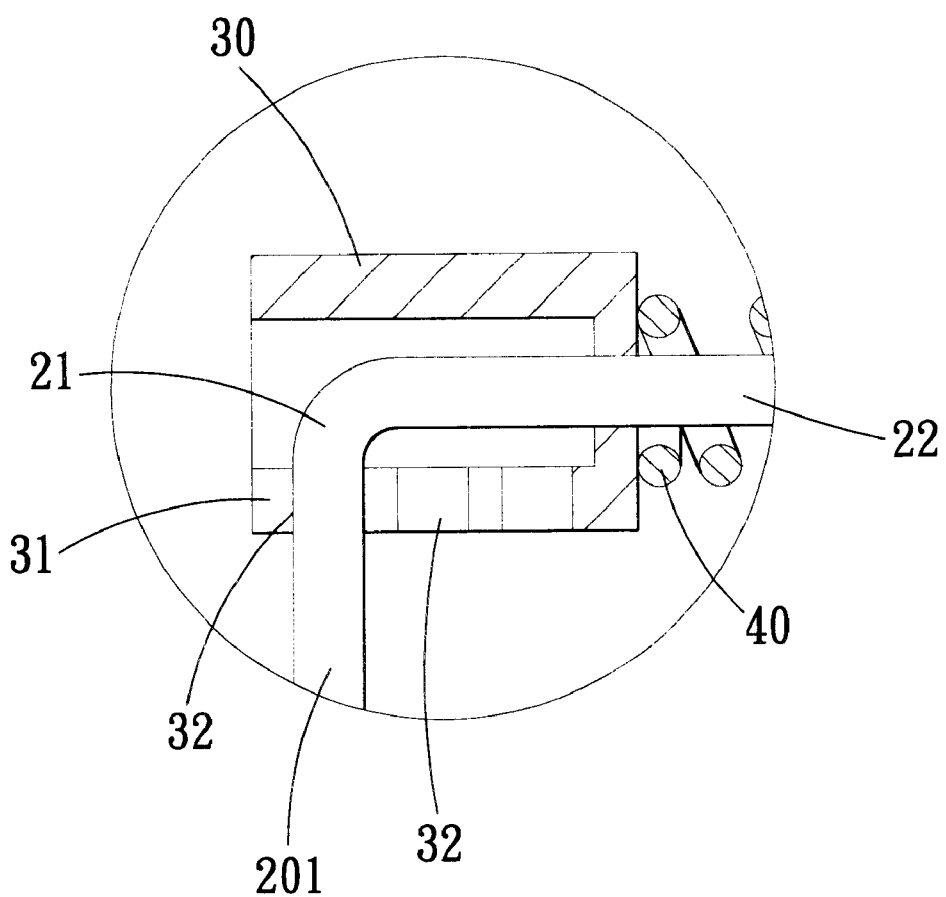
FIG. 3 is a cross sectional view to show the third section of the crank is engaged one of the notches in the sleeve.

A sleeve 30 is mounted to the fourth section 22 and a first end of the sleeve 30 is stopped by the third section 201. A groove 31 is defined longitudinally through the sleeve 30 and a plurality of notches 32 are defined in one of two sides of the groove 31. Therefore, the third section 201 can be engaged with one of the notches 32 as shown in FIG. 3. A spring 40 is mounted to the fourth section 22 and a positioning member 50 mounted to the fourth section 22. The spring 40 is located between the positioning member 50 and a second end of the sleeve 30. The positioning member 50 has a cone-shaped end 52 which faces a cone-shaped end 61 of the end member 60.

An end member 60 is mounted to the fourth section 22 and a gap is between the end member 60 and the sleeve 30 so that a mandrel of fishing line 71 is biased between the positioning member 50 and the end member 60. A bolt 63 radially extends through the end member 60 and contacts the fourth section 22 to position the end member 60 on the fourth section 22. The two cone-shaped ends 52, 61 respectively insert into two ends of the mandrel of fishing line 71. The notches 32 allows the users to choose a proper notch 32 that the third section 201 is engaged so as to adapt different length of the mandrel of fishing line 71.

As shown in FIG. 4, the fishing line 72 extending from the mandrel of fishing line 71 is pulled and connected to the reel 70. The user rotates the crank handle of the reel 70 to wind the fishing line 72 to the reel 70 conveniently.

While we have shown and described the embodiment in accordance with the present invention, it should be clear to those skilled in the art that further embodiments may be made without departing from the scope of the present invention.

What is claimed is:

1. A fishing line re-winding device comprising:

a handle and a crank connected to an end of said handle, said crank having a first section connected to said handle and a second section connected to said first section, a third section connected to said second section and a fourth section connected to said third section, an axis of said fourth section being perpendicular to an axis of said handle, and a sleeve mounted to said fourth section and a first end of said sleeve being stopped by said third section, an end member mounted to said fourth section and a gap between said end member and said sleeve, a spring mounted to said fourth section and a positioning member mounted to said fourth section, said spring located between said positioning member and a second end of said sleeve.

2. The device as claimed in claim 1, wherein said positioning member has a cone-shaped end facing a cone-shaped end of said end member.

3. The device as claimed in claim 1 further comprising a bolt radially extending through said end member and contacting said fourth section.

4. The device as claimed in claim 1 further comprising a groove defined longitudinally through said sleeve and a plurality of notches defined in one of two sides of said groove.

5. The device as claimed in claim 1 further comprising a flat surface defined in an outer periphery of said handle and a positioning collar is movably mounted to said handle.

* * * * *